United States Patent
Crabtree et al.

(10) Patent No.: US 12,355,809 B2
(45) Date of Patent: Jul. 8, 2025

(54) SYSTEM FOR AUTOMATED CAPTURE AND ANALYSIS OF BUSINESS INFORMATION FOR SECURITY AND CLIENT-FACING INFRASTRUCTURE RELIABILITY

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/582,519

(22) Filed: Feb. 20, 2024

(65) Prior Publication Data
US 2024/0195833 A1     Jun. 13, 2024

Related U.S. Application Data

(63) Continuation of application No. 18/501,977, filed on Nov. 3, 2023, now Pat. No. 12,003,534, which is a continuation of application No. 17/974,257, filed on Oct. 26, 2022, now Pat. No. 11,818,169, which is a continuation of application No. 17/169,924, filed on Feb. 8, 2021, now Pat. No. 11,570,209, which is a (Continued)

(51) Int. Cl.
    *H04L 29/06*     (2006.01)
    *H04L 9/06*     (2006.01)
    *H04L 9/40*     (2022.01)

(52) U.S. Cl.
CPC ........ *H04L 63/1466* (2013.01); *H04L 9/0643* (2013.01); *H04L 63/1416* (2013.01); *H04L 63/1425* (2013.01)

(58) Field of Classification Search
CPC ............... H04L 63/1466; H04L 9/0643; H04L 63/1416; H04L 63/1425; H04L 9/3213; H04L 63/0815; H04L 9/3239; G06Q 10/0637
See application file for complete search history.

(56) References Cited

U.S. PATENT DOCUMENTS 6,256,544 B1    7/2001   Weissinger
6,477,572 B1    11/2002   Elderton et al.
(Continued)

OTHER PUBLICATIONS

A. A. Kothari and W. D. Patel, "A Novel Approach Towards Context Sensitive Recommendations Based on Machine Learning Methodology," 2015 Fifth International Conference on Communication Systems and Network Technologies, Gwalior, India, 2015, pp. 1114-1118, doi: 10.1109/CSNT.2015.191. (Year: 2015).*

*Primary Examiner* — Ka Shan Choy
(74) *Attorney, Agent, or Firm* — Galvin Patent Law LLC; Brian R. Galvin

(57) ABSTRACT

A system for fully integrated collection of business impacting data, analysis of that data and generation of both analysis driven business decisions and analysis driven simulations of alternate candidate business actions has been devised and reduced to practice. This business operating system may be used to monitor and predictively warn of events that impact the security of business infrastructure and may also be employed to monitor client-facing services supported by both software and hardware to alert in case of reduction or failure and also predict deficiency, service reduction or failure based on current event data.

9 Claims, 7 Drawing Sheets

Related U.S. Application Data continuation-in-part of application No. 15/837,845, filed on Dec. 11, 2017, now Pat. No. 11,005,824, which is a continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(60) Provisional application No. 62/596,105, filed on Dec. 7, 2017.

(56) References Cited

U.S. PATENT DOCUMENTS

| | | | |
|---|---|---|---|
| 7,281,125 B2 | 10/2007 | Challener et al. | |
| 7,546,333 B2 | 6/2009 | Alon et al. | |
| 7,702,821 B2 | 4/2010 | Feinberg et al. | |
| 7,818,417 B2 | 10/2010 | Ginis et al. | |
| 8,417,656 B2 | 4/2013 | Beg et al. | |
| 8,601,554 B2 | 12/2013 | Gordon et al. | |
| 8,751,867 B2 | 6/2014 | Marvasti et al. | |
| 9,137,024 B2 | 9/2015 | Swingler et al. | |
| 9,202,040 B2 | 12/2015 | Rosenblatt et al. | |
| 9,253,643 B2 | 2/2016 | Pattar et al. | |
| 9,292,692 B2 | 3/2016 | Gardner et al. | |
| 9,596,141 B2 | 3/2017 | Mcdowall et al. | |
| 9,602,530 B2 | 3/2017 | Ellis et al. | |
| 9,652,604 B1 | 5/2017 | Johansson et al. | |
| 9,749,197 B2* | 8/2017 | Hao | H04L 67/53 |
| 9,774,522 B2 | 9/2017 | Vasseur et al. | |
| 9,781,144 B1 | 10/2017 | Otvagin et al. | |
| 10,038,559 B2 | 7/2018 | Burrows et al. | |
| 10,061,635 B2 | 8/2018 | Ellwein et al. | |
| 10,248,910 B2 | 4/2019 | Crabtree et al. | |
| 10,305,902 B2 | 5/2019 | Kim et al. | |
| 10,367,829 B2 | 7/2019 | Huang et al. | |
| 10,410,214 B2 | 9/2019 | Doyle et al. | |
| 10,445,482 B2 | 10/2019 | Ren et al. | |
| 10,628,578 B2 | 4/2020 | Eksten et al. | |
| 10,645,086 B1 | 5/2020 | Hadler | |
| 2003/0145225 A1 | 7/2003 | Bruton et al. | |
| 2005/0021025 A1 | 1/2005 | Buysse et al. | |
| 2007/0150744 A1 | 6/2007 | Cheng et al. | |
| 2007/0233536 A1* | 10/2007 | Johnson | G06Q 10/06311 705/7.11 |
| 2008/0021866 A1 | 1/2008 | Hinton et al. | |
| 2009/0094372 A1 | 4/2009 | Nyang et al. | |
| 2011/0029636 A1* | 2/2011 | Smyth | G06F 16/958 709/217 |
| 2011/0087888 A1 | 4/2011 | Rennie | |
| 2013/0117831 A1 | 5/2013 | Hook et al. | |
| 2014/0159150 A1 | 6/2014 | Kirisawa | |
| 2014/0324521 A1* | 10/2014 | Mun | G06Q 30/0201 705/7.28 |
| 2015/0128258 A1 | 5/2015 | Novozhenets | |
| 2015/0281225 A1 | 10/2015 | Schoen et al. | |
| 2015/0373043 A1* | 12/2015 | Wang | G06F 21/6254 706/12 |
| 2016/0072845 A1 | 3/2016 | Chiviendacz et al. | |
| 2016/0275123 A1 | 9/2016 | Lin et al. | |
| 2017/0075543 A1 | 3/2017 | Ainalem et al. | |
| 2021/0099868 A1 | 4/2021 | Damlaj et al. | |

\* cited by examiner

SYSTEM FOR AUTOMATED CAPTURE AND ANALYSIS OF BUSINESS INFORMATION FOR SECURITY AND CLIENT-FACING INFRASTRUCTURE RELIABILITY

CROSS-REFERENCE TO RELATED APPLICATIONS

Priority is claimed in the application data sheet to the following patents or patent applications, each of which is expressly incorporated herein by reference in its entirety:
Ser. No. 18/501,977
Ser. No. 17/974,257
Ser. No. 17/169,924
Ser. No. 15/837,845
62/596,105
Ser. No. 15/825,350
Ser. No. 15/725,274
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536

BACKGROUND OF THE INVENTION

Field of the Art

The present invention is in the field of use of computer systems in business information management, operations and predictive planning. Specifically, the development of a system that integrates the functions of business information and operating data, complex data analysis and use of that data, preprogrammed commands and parameters and machine learning to create a business operating system capable of predictive decision making and action path outcome simulation herein as applied to IT systems security and reliability of client-facing IT infrastructure.

Discussion of the State of the Art

Over the past decade the amount of financial, operational, infrastructure, risk management and philosophical information available to decision makers of a business from such sources as ubiquitous sensors found on a business's equipment or available from third party sources, detailed cause and effect data, and business process monitoring software has expanded to the point where the data has overwhelmed the abilities of virtually anyone to follow all of it much less interpret and make meaningful use of that available data in a given business environment. In other words, the torrent of information now available to a decision maker or group of decision makers has far outgrown the ability of those in most need of its use to either fully follow it or reliably use it. Failure to recognize important trends or become aware of information in a timely fashion has led to highly visible, customer facing, outages at NETFLIX™, FACEBOOK™, and UPS™ over the past few years, just to list a few.

There have been several developments in business software that have arisen with the purpose of streamlining or automating either business data analysis or business decision process. PLANATIR™ offers software to isolate patterns in large volumes of data, DATABRICKS™ offers custom analytics services ANAPLAN™ offers financial impact calculation services and there are other software sources that mitigate some aspect of business data relevancy identification, analysis of that data and business decision automation, but none of these solutions handle more than a single aspect of the whole task. Similarly products like DATADOG™ and BMC INSIGHT™ allow businesses to monitor the function of their IT infrastructure and business software but lack the ability to perform the complex operation queries of large sections of that infrastructure so as to forecast impending bottlenecks, deficiencies and even customer facing failures.

What is needed is a fully integrated system that retrieves business relevant information from many diverse sources, identifies and analyzes that high volume data, transforming it to a business useful format and then uses that data to create intelligent predictive business decisions and business pathway simulations, forming a "business operating system."

SUMMARY OF THE INVENTION

Accordingly, the inventor has developed a distributed system for the fully integrated retrieval, and deep analysis of business operational information from a plurality of sources. The system further uses results of business information analytics to optimize the making of business decisions and allow for alternate action pathways to be simulated using the latest data and machine mediated prediction algorithms. Specifically, portions of the system are applied to the areas of IT security and predictively enhancing the reliability of client-facing IT infrastructure.

According to a preferred embodiment of the invention, 1. A system for fully integrated collection of business impacting data, analysis of that data and generation of both analysis driven business decisions and analysis driven simulations of alternate candidate business decision comprising: a business data retrieval engine stored in a memory of and operating on a processor of a computing device, a business data analysis engine stored in a memory of and operating on a processor of a computing device and a business decision and business action path simulation engine stored in a memory of and operating on a processor of one of more computing devices. The business information retrieval engine: retrieves a plurality of business related data from a plurality of sources, accepts a plurality of analysis parameters and control commands directly from human interface devices or from one or more command and control storage devices and stores accumulated retrieved information for processing by data analysis engine or predetermined data timeout. The business information analysis engine: retrieves a plurality of data types from the business information retrieval engine, and performs a plurality of analytical functions and transformations on retrieved data based upon the specific goals and needs set forth in a current campaign by business process analysis authors. The business decision and business action path simulation engine: employs results of data analyses and transformations performed by the business information analysis engine, together with available supplemental data from a plurality of sources as well as any current campaign specific machine learning, commands and parameters from business process analysis authors to formulate current business operations and risk status reports and employs results of data analyses and transformations performed by the business information analysis engine, together with available supplemental data from a plurality of sources, any current campaign specific commands and parameters from business process analysis authors, as well as input gleaned from machine learned algorithms to deliver business action pathway simulations and business decision support to a first end user.

According to another embodiment of the invention, the system's business information retrieval engine a stored in the memory of and operating on a processor of a computing device, employs a portal for human interface device input at least a portion of which are business related data and at least another portion of which are commands and parameters related to the conduct of a current business analysis campaign. The business information retrieval engine employs a high volume deep web scraper stored in the memory of an operating on a processor of a computing device, which receives at least some scrape control and spider configuration parameters from the highly customizable cloud based interface, coordinates one or more world wide web searches (scrapes) using both general search control parameters and individual web search agent (spider) specific configuration data, receives scrape progress feedback information which may lead to issuance of further web search control parameters, controls and monitors the spiders on distributed scrape servers, receives the raw scrape campaign data from scrape servers, aggregates at least portions of scrape campaign data from each web site or web page traversed as per the parameters of the scrape campaign. The archetype spiders are provided by a program library and individual spiders are created using configuration files. Scrape campaign requests are persistently stored and can be reused or used as the basis for similar scrape campaigns. The business information retrieval engine employs a database (such as a multidimensional time series, SQL, graph, or NOSQL database) stored in a memory of and operating on a processor of a computing device to receive a plurality of data from a plurality of sensors of heterogeneous types, some of which may have heterogeneous reporting and data payload transmission profiles, aggregates the sensor data over a predetermined amount of time, a predetermined quantity of data or a predetermined number of events, retrieves a specific quantity of aggregated sensor data per each access connection predetermined to allow reliable receipt and inclusion of the data, transparently retrieves quantities of aggregated sensor data too large to be reliably transferred by one access connection using a further plurality access connections to allow capture of all aggregated sensor data under conditions of heavy sensor data influx and stores aggregated sensor data in a simple key-value pair with very little or no data transformation from how the aggregated sensor data is received. Last, the business data analysis engine employs a directed computational graph stored in the memory of and operating on a processor of a computing device which, retrieves streams of input from one or more of a plurality of data sources, filters data to remove data records from the stream for a plurality of reasons drawn from, but not limited to a set comprising absence of all information, damage to data in the record, and presence of in-congruent information or missing information which invalidates the data record, splits filtered data stream into two or more identical parts, formats data within one data stream based upon a set of predetermined parameters so as to prepare for meaningful storage in a data store, sends identical data stream further analysis and either linear transformation or branching transformation using resources of the system.

According to another embodiment of the invention, a method for fully integrated capture, and transformative analysis of business impactful information resulting in predictive decision making and simulation the method comprising the steps of: (a) retrieving business related data and analysis campaign command and control information using a business information retrieval engine stored in the memory of an operating on a processor of a computing device; (b) analyzing and transforming retrieved business related data using a business information analysis engine stored in the memory of an operating on a processor of a computing device in conjunction with previously designed analysis campaign command and control information; and (c) presenting business decision critical information as well as business action pathway simulation information using a business decision and business action path simulation engine based upon the results of analysis of previously retrieved business related data and previously entered analysis campaign command and control information.

According to another embodiment of the invention, a method for the detection of Kerberos based security exploits using a system for fully integrated capture, and analysis of business information the method comprising the steps of: (a) retrieving ticket granting ticket request information, service session key request information, user sign on attempt data from a Kerberos domain controller using a multidimensional time series database module stored in a memory of and operating on a processor of a computing device; (b) applying any pre-programmed multiple dimensional time series event-condition-action rules that are present and apply to Kerberos protocol events using the multidimensional time series database module; (c) performing conversion of data into graphs where objects are vertices and their relationships edges between vertices using a graph stack service stored in a memory of and operating on a processor of a computing device; and (d) performing an analytical transformation using a directed computational graph module. This technology stack may be applied without loss of generality to other problems, according to the invention.

According to yet another embodiment of the invention, a method to monitor the function of business critical IT infrastructure and business software performance using a system for fully integrated capture, and analysis of business information resulting in improved client-facing IT infrastructure reliability the method comprising the steps of: (a) Monitor IT equipment and application status statistics as well as failure messages using a multidimensional time series database module stored in a memory of and operating on a processor of a computing device. (b) Process the data retrieved from multidimensional time series database module using a graph stack service stored in a memory of and operating on a processor of a computing device with infrastructure items and software forming vertices of a relational graph and relationships between them forming edges of the graph. (c) Transform data acquired by the multidimensional time series database module using directed computational graph to formulate more complex diagnostic queries based upon the existing data using pre-programmed logic and machine learning and then process the results of those complex queries as predetermined by authors of the monitoring effort. (d) Present the results in format best suited to the downstream use of the processed data and wherein at least one set of results are displayed using an observation and state estimation service stored in a memory of and operating on a processor of a computing device

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE INVENTION

Figure 1:
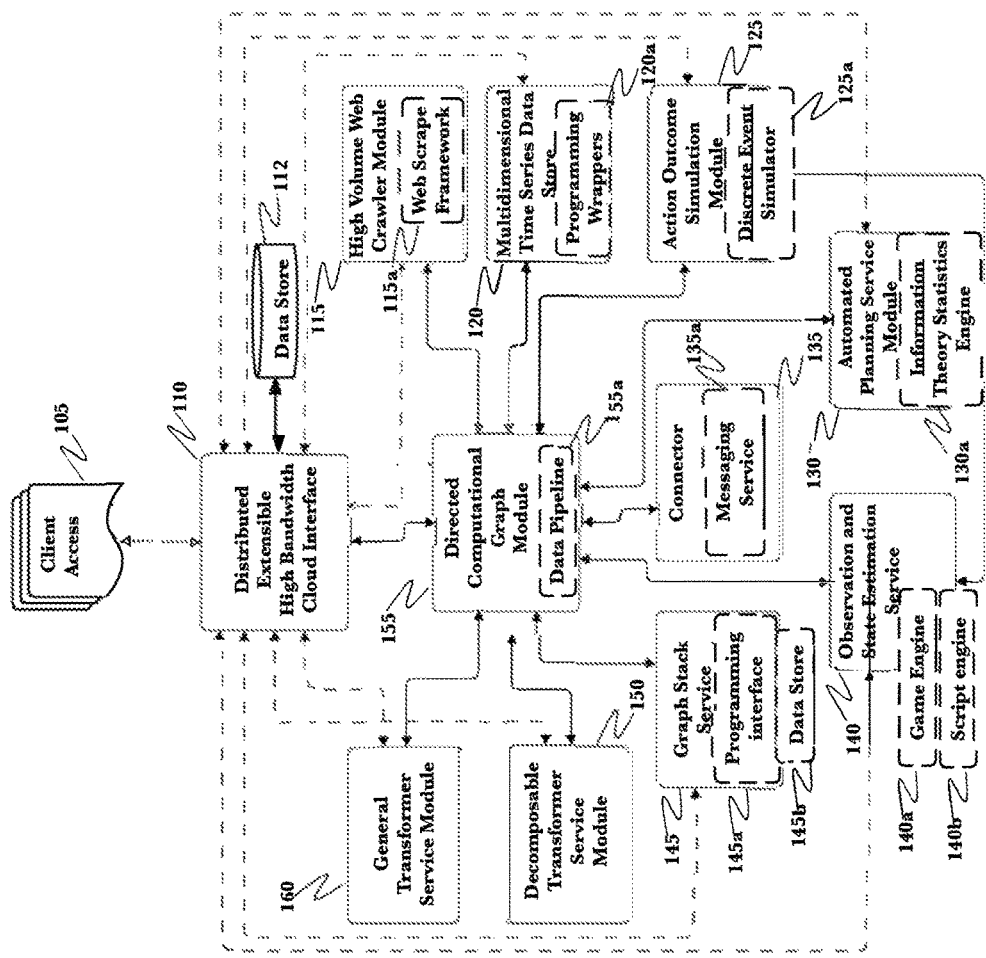
FIG. 1 is a diagram of an exemplary architecture of a business operating system according to an embodiment of the invention.

The inventor has conceived, and reduced to practice, a system and method for fully integrated capture and analysis of business information resulting in predictive decision making and simulation.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources, also enter the system through the cloud interface 110, data being passed to the analysis and transformation components of the system, the directed computational graph module 155, high volume web crawler module 115, multidimensional time series database 120 and the graph stack service. The directed computational graph module 155 retrieves one or more streams of data from a plurality of sources, which includes, but is in no way not limited to, a plurality of physical sensors, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series database module 120 receives data from a large plurality of sensors that may be of several different types. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph data store 145b such as GIRAPH™ or a key value pair type data store REDIS™, or RIAK™, among others, all of which are suitable for storing graph represented information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. Then, using all available data, the automated planning service module 130 may propose business decisions most likely to result in the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 100 has data from them, which no one really studied due to the great volume of columnar figures, so the alternative courses 125, 140 of action are run. The system, based on all available data, predicts that the fouled sensor or pump is unlikely to be the root cause this time due to other available data, and the contractor is dispatched. She finds a small breach in the pipeline. There will be a small cleanup and the pipeline needs to be shutdown for repair but multiple tens of millions of dollars have been saved. This is just one example of a great many of the possible use of the business operating system, those knowledgeable in the art will easily formulate more.

Figure 2:
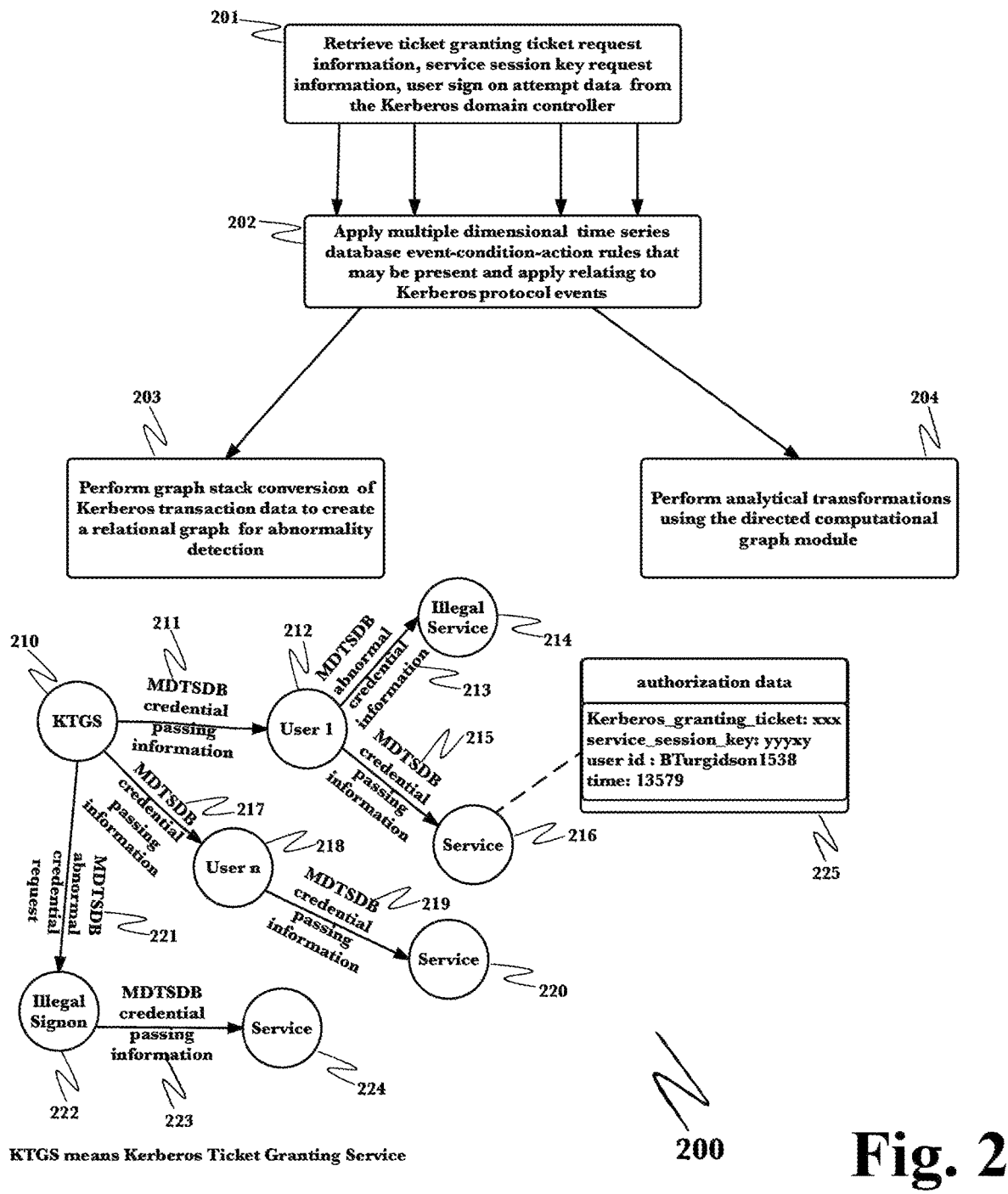
FIG. 2 is a process flow diagram showing an exemplary set of steps used in the function of the very high bandwidth cloud interface.

FIG. 2 is a process flow diagram showing an exemplary set of steps by an embodiment of the invention to monitor security exploits against a business's KERBEROS based domain controller 200. These exploits occur when an intruder is able to obtain a functional user level authentication credential (ticket-granting-ticket exploit) without passing challenge, is able to gain access to system or network services for which they are not authorized (service-ticket exploit) or are able to steal user sign on credentials (principle-key exploit) and masquerade as that user. To monitor for these and possible other security related activities the multidimensional time series database (MDTSDB) as depicted in FIG. 1, 120 may be programmed to retrieve all KERBEROS™ domain controller ticket requests (including both protocol and log-based requests), including ticket-granting-ticket requests, service-session ticket requests, and user sign on attempts from one or more of the business's domain controllers. With that basic information, the MDTSDB may also retrieve information such as but not necessarily limited to: the userid attached to each request, the time of the request, the workstation from which the request was made, and for derivative credentials such as a service-ticket, the requesting ticket-granting-ticket credential. Using pre-programmed logic specific to the circumstances, the MDTSDB may transform the data in some way. That data may then go to the graph stack service module depicted in 145 which may map the data into a relational graph where the objects, for example a user 212, 218 the KERBEROS™ ticket granting service (KTGS, 210) and requested services 214, 216, 220, 224 are represented as graph vertices and the information passage relationships between them 211, 213, 215, 217, 219, 221, 223 forming the edges of the graph 203. Such graph analysis may allow abnormal activity to be rapidly identified as shown in edge 213 and vertex 214 is an extremely simplified example of service ticket exploit where a user illegally accesses a system or network service for which she has no authority and 221 where an intruder gains access to the system using an exploitively gained ticket-granting-ticket and then uses a system service. Panel 225 shows a highly simplified example of time series authorization data that may be attached to a specific service and shows the granting ticket used to access the service, the service key that allows access the user that requested the service and a timestamp for receipt of the information.

Events including security breaches are often preceded by smaller occurrences that either go totally unnoticed or are not recognized as significant to the future calamity. Under this embodiment the directed computational graph module depicted in 155, with its multi-transformation capable data pipeline depicted in 155*a*, 150 (non-linear transformations), 160 (linear transformations) and machine learning abilities may be used to deeply analyze the data retrieved by the MDTSDB depicted in 120 in complex ways which may allow prediction of an impending security exploit. As an extremely simple example, mass sign on attempts from ip address ranges of an organization known to infiltrate KERBEROS™ domain controllers similar to that of the client business may occur during off hours every third day and this may be uncovered during directed computational graph 155 analysis. Output (not depicted) would be formatted to best serve its pre-decided purpose.

Figure 3:
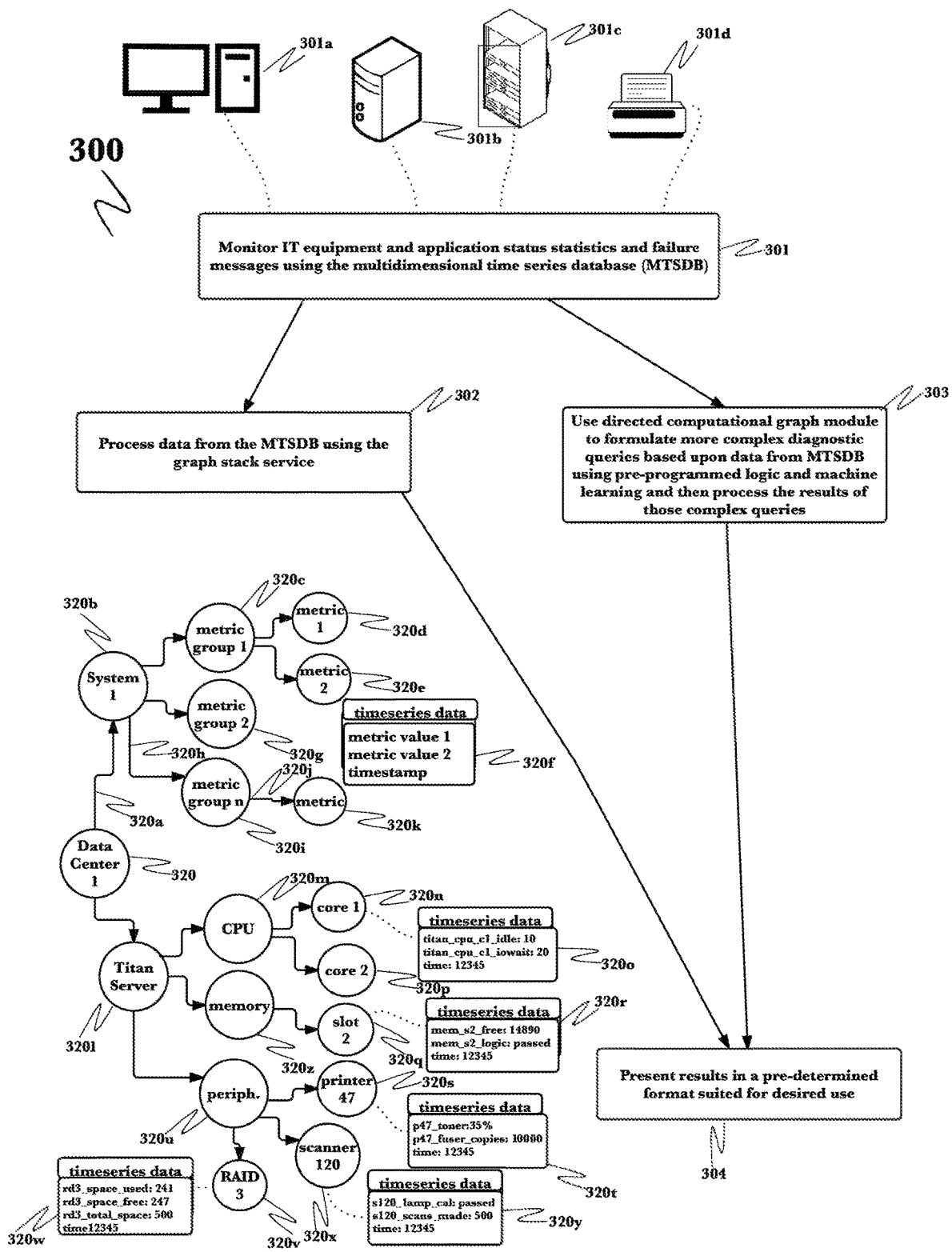
FIG. 3 is a diagram of an exemplary architecture for a linear transformation pipeline system which introduces the concept of the transformation pipeline as a directed graph of transformation nodes and messages according to an embodiment of the invention.

FIG. 3 is a process flow diagram of a preferred method for use of the invention to monitor enterprise IT infrastructure both hardware and software, especially customer facing services supported by this infrastructure for slowdown, bottleneck or failure. In one embodiment, IT infrastructure including, but not limited to workstations 301*a*, servers 301*b*, 301*c* and peripherals which may include printers 301*d* are monitored by multidimensional time series database module (MDTSDB), depicted in 120, 301 possibly using a standard network messaging protocol such as SNMP, as an example, or a specifically programmed adaptor present in the MDTSDB for this purpose. The MDTSDB may transform data as it is captured depending on the requirements of the task prior to the data passing to other modules of the embodiment such as the graph stack service module depicted in 145, 302 where the data from the MDTSDB is processed into a open graph IT ontology compliant relational graph representation as a prelude to further analysis. The relational graph is created within the graph stack service by assigning the objects of the system under analysis, for example: data centers, servers, workstations, and peripherals, as vertices of the graph and the relationships between them as edges. A generic example of such a relational graph if depicted in 320, 320*a* through 320*k*. Looking at 320*a* through 320*k*, line 320*a* depicts the relationship between the Data Center 1 vertex 320 and the generic "System 1" vertex 320*b*, thus 320*a* may be thought of as the "Data Center 1"-"System 1" relation. From "System 1" 320*b*, the graph progresses a complexity gradient first encountering metric group vertices 320*c*, 320*g*, 320*i* and then the individual metrics measured within those groups, 320*d*, 320*e*, 320*k*. Another relationship between "System 1" 320*b* and "metric group n" 320*i* is depicted 320*h* this is the "System 1"-"metric group n" relation. Finally, an generic example of specific MDTSDB captured data, stored in the vertices is shown in 320*f* and is expanded from "metric 2" 320*e*.

Now familiar with a general relational graph example, an application of graph creation from IT infrastructure monitoring application specific example MDTSDB (see 120) captured data is depicted 320, 320*l* through 320*z*. Starting at "Titan Server" 320*l*, which forms a graph vertex and also which, consulting the graph, is shown located in "Data Center 1" 320, which is another, more complex, graph vertex. A representative, though certainly not exhaustive, sample of the Titan Server's 320*l* constituent hardware parts are depicted 320*m*, 320*z*, 320*u*. Relationships are denoted by the lines, or edges between the vertices. The vertices that occur as constituents of "Titan Server" 320*l* in this example are "CPU" 320*m*, "memory" 320*z* and "peripheral" 320*u* with the direct connection relationships denoted by the graph edges between them and "Titan Server" 320*l*. From the graph, it can be easily seen that "Titan Server" 320*l* has a CPU 320*m* with two cores, "core 1" 320*n*, and "core 2" 320*p*, one occupied memory slot, 'slot 2" 320*q* and a directly connected printer "printer 47" 320*s*, "scanner 120" 320*x* and "RAID 3" 320*v* designated as peripherals "periph." 320*u*. MDTSDB (see 120) captured data pertaining to "core 1" 320*n*, the memory in memory 320*z* "slot 2" 320*q*, "printer 47" 320*s*, "scanner 120" 320*x* and "RAID 3" 320*v* are displayed 320*o*, 320*r*, 320*t*, 320*y* and 320*w* respectively. Focusing on the component data display for "printer 47" 320*t* one can determine that the current toner cartridge has approximately 35% toner remaining and the current fuser has printer 10,000 pages. The timestamp indicates when the data was collected. The data displays for the other components show comparably useful information. It must be noted that the server specific graph shown 320*l* through 320*z* is extensively simplified in that only a very few of the possible component groups (CPU, memory, peripherals to be monitored are depicted, a minimal number of underlying components 320*n*, 320*p*, 320*q*, 320*s*320*x* 320*v* are present and data shown in the data displays 320*o*, 320*r*, 320*t*,320*y*,320*w* is minimal, incomplete and haphazardly chosen. Also vertex data displays 320*o*, 320*r*, 320*t*,320*y*,320*w* occur only at the termini. All of these characteristics of the example graph are present solely for presentation clarity purposes and in no way should be interpreted as limiting the invention. The invention is able to monitor any reported component characteristic known to those knowledgeable in the field. The graph stack service module see 145 is able to map relationships of any foreseeable complexity and while the example data displays 320*o*, 320*r*, 320*t*,320*y*,320*w* showed a few lines of data and all displays were at terminal vertices, the length or content of the data displayed in not limited by the invention and data displays can be associated with any vertex of the graph, so, for example one could cause a possibly very lengthy data display showing all pre-determined applicable data to be shown for "Titan Server" vertex 320*l*.

While displaying the current operating data of a business's infrastructure is a very powerful tool and can disclose certain issues, the ability to predict likely future significant slowdowns, deficiencies and outages through the intelligent interpretation of small variances in current data and event chain progressions so as to prevent noticeable degradation of service is an extremely powerful tool offered by the invention. Under this embodiment the directed computational graph module depicted in 155, with its multi-transformation capable data pipeline depicted in 155*a*, 150 (non-linear transformations), 160 (linear transformations) and machine learning abilities may be used to deeply analyze the data retrieved by the MDTSDB depicted in 120 in complex ways which, when coupled with historic data that may span months or years may allow prediction of an impending degradation or loss of a business's customer facing IT services, whether hardware or software is the root cause. As an extremely simple example, web site based requests for further information about a business's newer product lines may, when it reaches a certain level may cause thrashing and bottlenecks in the database storing those documents which up until this point has caused negligible loss of retrieval speed, but recent historical data shows demand for the documents is building and the issue in the database is escalating at a disproportional rate. Within the embodiment, data from the MDTSDB is retrieved by the directed computational graph module 303 which then performs more complex analyses on the data and determines that the issue lies in that the customer document mailing software in use has a long revision history and is writing customer contact information to several tables in the database, some no longer used and some better done asynchronously, also the routines within the software for mailing materials is also outdated an inefficient, again taxing the database but also not using all of the currently available printer queues, delaying print job confirmation and again indirectly slowing the database as it records those confirmations. Last, the database manager is no longer optimally tuned for current business realities. These example emerging issues would have eventually become noticeable and serious. It should be remembered that as a single example, the above should in no way be regarded as defining of constraining the capabilities of the invention.

Output would be formatted to best serve its pre-decided purpose 304 and may involve use of the action outcome simulation module to create a simulation of future infrastructure events 125 and the game engine and scriptability of observation and state estimation service module 140 to present the results in a easily comprehended, dramatic and memorable way.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
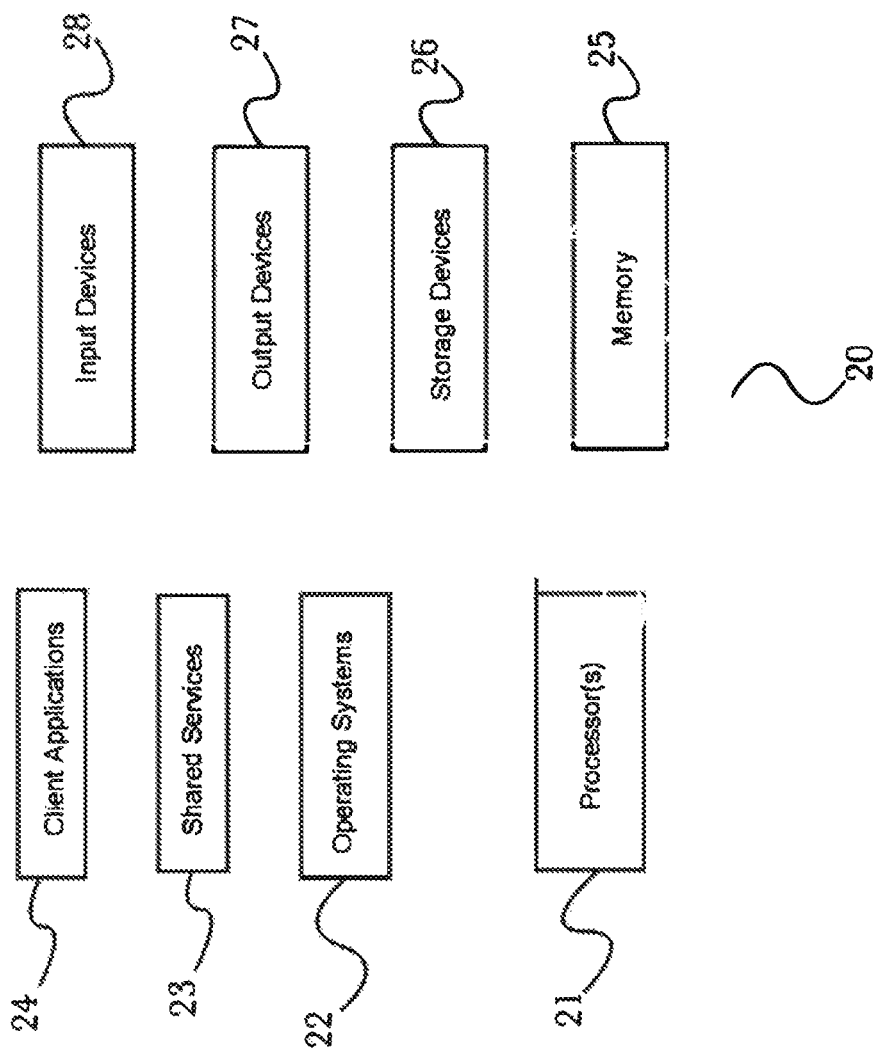
FIG. 4 is a block diagram illustrating an exemplary hardware architecture of a computing device used in various embodiments of the invention.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
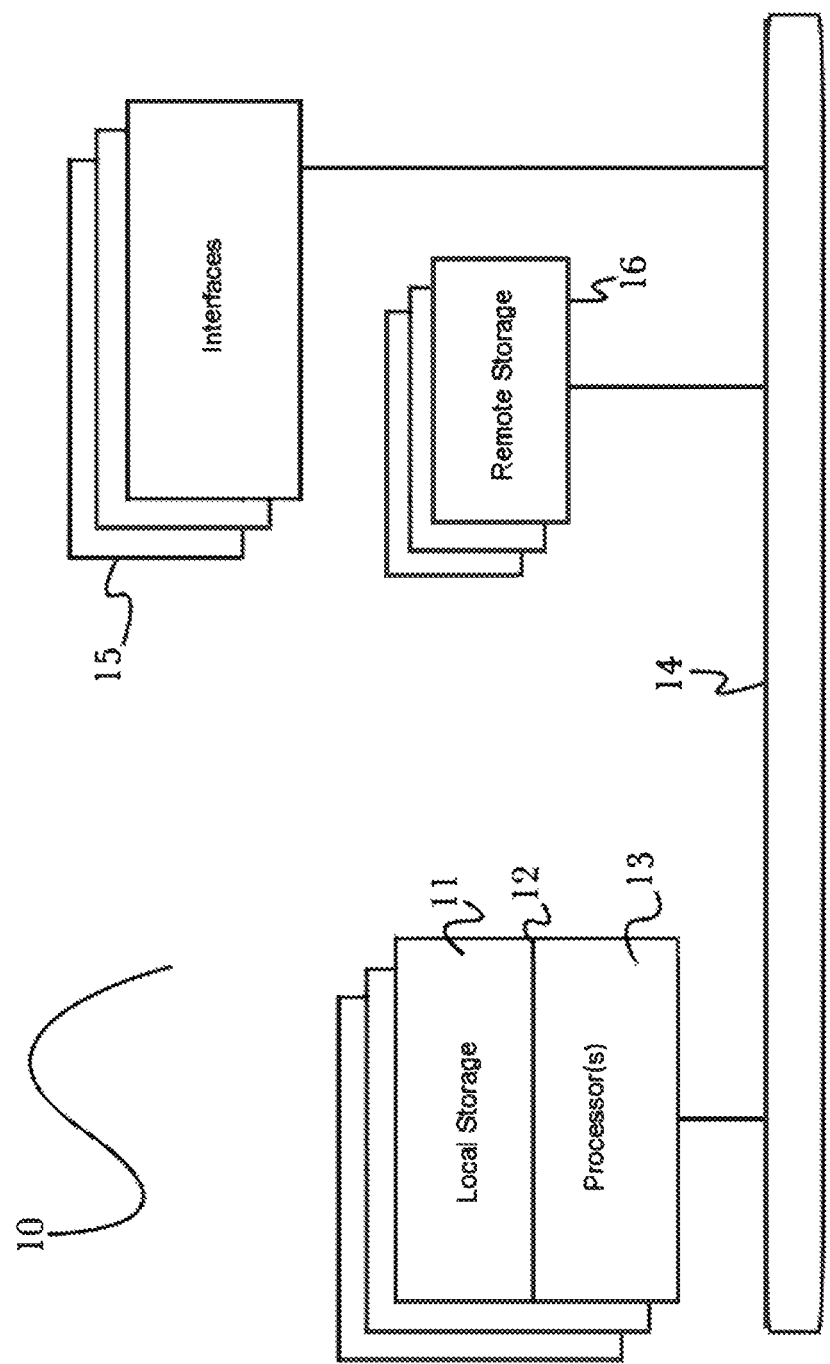
FIG. 5 is a block diagram illustrating an exemplary logical architecture for a client device, according to various embodiments of the invention.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, userspace common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 6:
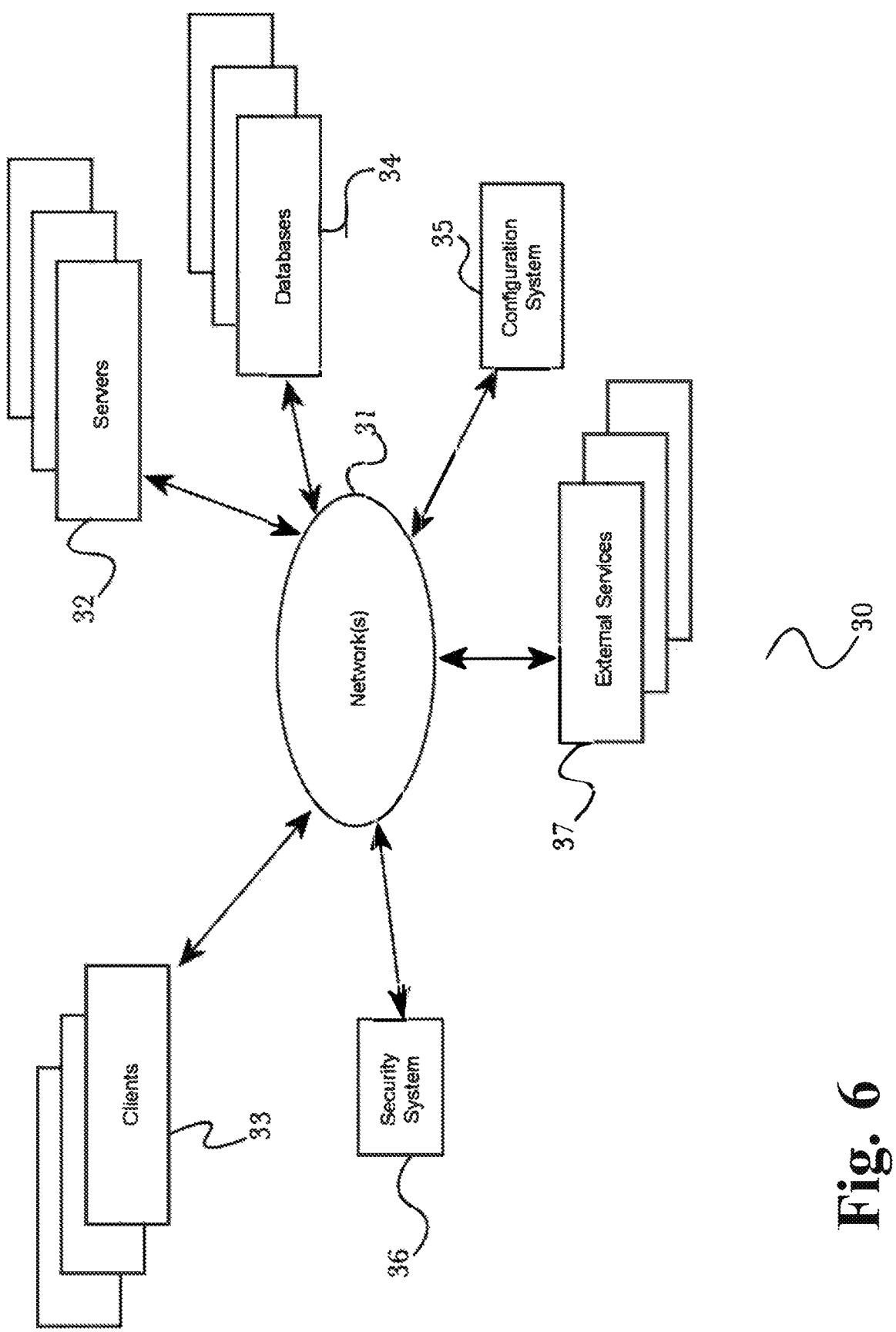
FIG. 6 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
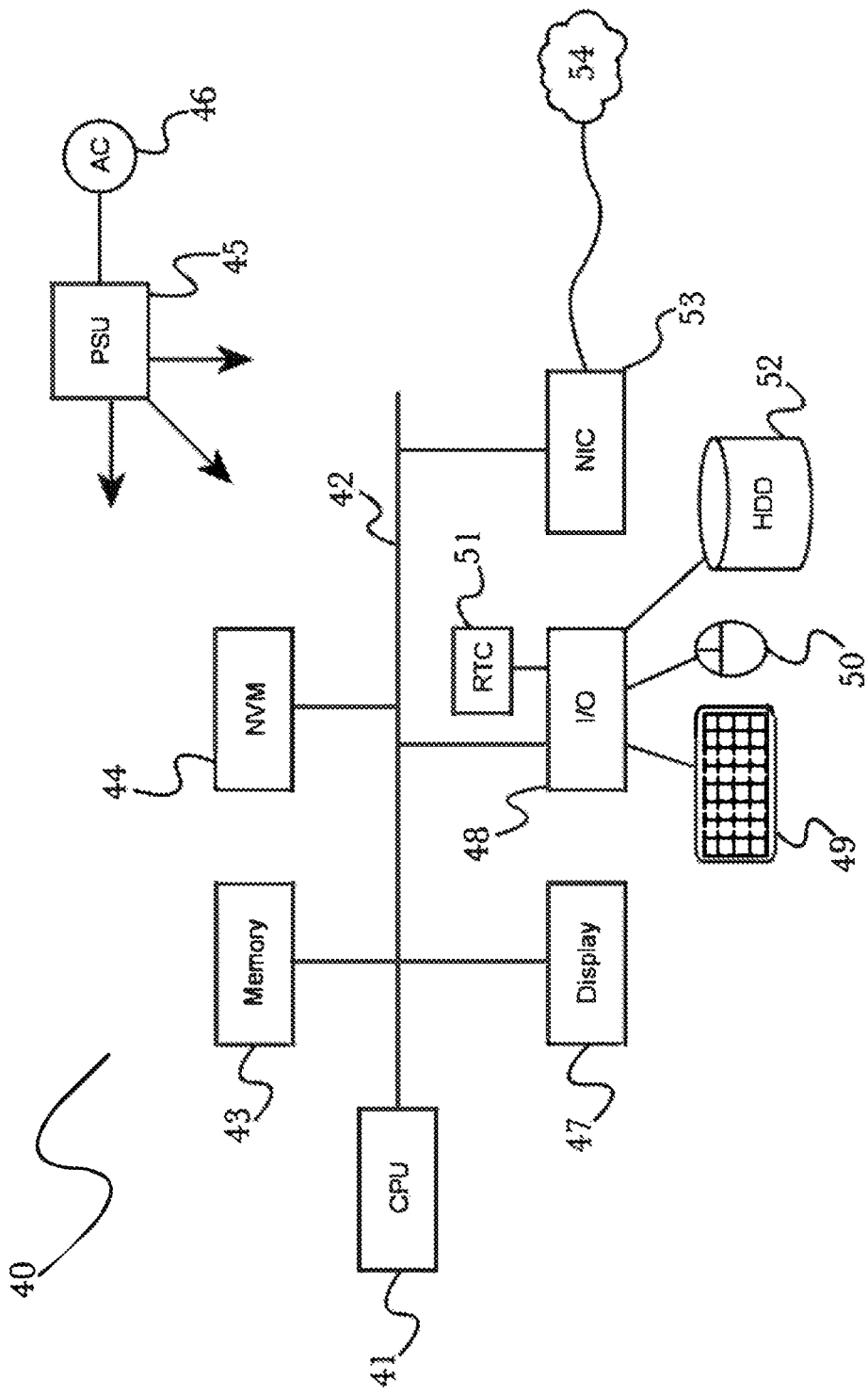
FIG. 7 is another block diagram illustrating an exemplary hardware architecture of a computing device used in various embodiments of the invention.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for fully integrated collection and analysis of empirical and simulated data and generation of analysis-driven simulations of alternate candidate decisions comprising:
   a plurality of computing devices each comprising at least a processor, a memory, and a network interface;
   wherein a plurality of programming instructions stored in one or more of the memories and operating on one or more of the processors of the plurality of computing devices causes the plurality of computing devices to:
   based on a request for action recommendations from a user device, retrieve a plurality of data from a plurality of sources via one or more data networks;
   receive a plurality of analysis parameters and control commands via the one or more data networks;
   aggregate and store retrieved information for analysis;
   perform a plurality of analyses and data transformations or simulations on the retrieved data based on the analysis parameters;
   augment the results of data analyses and transformations or simulations with domain-specific machine learning based at least in part on the retrieved data and the received analysis parameters and control commands;
   automatically generate and execute one or more viable action pathway simulations using the augmented results; and
   present recommended actions to the user device.

2. The system of claim 1, wherein the aggregated data is received from a plurality of sensors of heterogeneous types and is stored in a multidimensional time series data store.

3. The system of claim 1, wherein a directed computational graph retrieves streams of input from one or more of the plurality of data sources, filters data to remove data records from the stream, splits filtered data streams into two or more identical parts, and sends the two or more identical parts for independent analysis and simulation.

4. The system of claim 1, wherein a graph stack service organizes data retrieved from the multidimensional time series database into graph formats where the objects are represented as vertices and the relationships between them as edges of the graph.

5. A method for fully integrated collection and analysis of data and generation of analysis-driven simulations of alternate candidate decisions comprising the steps of:
   based on a request for action recommendations from a user device, retrieving a plurality of data from a plurality of sources via one or more data networks;
   receiving a plurality of analysis parameters and control commands via the one or more data networks;
   aggregating and store retrieved information for analysis;
   performing a plurality of analyses and data transformations on the retrieved data based on the analysis parameters;
   augmenting the results of data analyses and transformations with domain-specific machine learning based at least in part on the retrieved data and the received analysis parameters and control commands;
   automatically generating and executing one or more action pathway simulations using the augmented results; and
   presenting recommended actions to the user device.

6. The method of claim 5, wherein the aggregated data is received from a plurality of sensors of heterogeneous types and is stored in a multidimensional time series data store.

7. The method of claim 5, wherein a directed computational graph retrieves streams of input from one or more of the plurality of data sources, filters data to remove data records from the stream, splits filtered data streams into two or more identical parts, and sends the two or more identical parts for independent analysis and simulation.

8. The method of claim 5, wherein a graph stack service organizes data retrieved from the multidimensional time series database into graph formats where the objects are represented as vertices and the relationships between them as edges of the graph.

9. A computer-readable, non-transitory medium comprising a plurality of programming instructions that, when operating on a plurality of computing devices each comprising at least a processor, a memory, and a network interface, cause the plurality of computing devices to carry out the method of claim 5.

\* \* \* \* \*